United States Patent
Grattan

(10) Patent No.: US 10,086,887 B1
(45) Date of Patent: Oct. 2, 2018

(54) SPARE TIRE STORAGE COVER ASSEMBLY

(71) Applicant: Nissan North America, Inc., Franklin, TN (US)

(72) Inventor: Patrick Grattan, Wixom, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 15/639,040

(22) Filed: Jun. 30, 2017

(51) Int. Cl.
   *B62D 43/04* (2006.01)
   *B62D 43/00* (2006.01)

(52) U.S. Cl.
   CPC ........... *B62D 43/005* (2013.01); *B62D 43/04* (2013.01)

(58) Field of Classification Search
   CPC ..... B62D 43/04; B62D 43/045; B62D 43/005
   USPC ........... 224/42.12, 42.13, 42.2, 42.23, 42.24
   See application file for complete search history.

(56) References Cited

U.S. PATENT DOCUMENTS

| | | | | |
|---|---|---|---|---|
| 2,102,468 A | * | 12/1937 | Lyon .................... | B62D 43/005 206/304.2 |
| 4,498,614 A | * | 2/1985 | Guarr ..................... | B60R 11/06 224/42.13 |
| 4,948,021 A | * | 8/1990 | Murphy .................... | B60R 9/06 224/42.13 |
| 5,429,285 A | * | 7/1995 | Kim ........................ | B60R 11/06 206/373 |
| 5,513,788 A | * | 5/1996 | Cochrane ............. | B62D 43/005 224/42.12 |
| 5,823,413 A | * | 10/1998 | Seltz ..................... | B62D 43/005 224/402 |
| 6,044,968 A | * | 4/2000 | Iampen ................... | B05C 11/11 118/505 |
| 7,036,697 B2 | * | 5/2006 | Hwang .................... | B60R 11/06 206/373 |
| 7,195,231 B2 | * | 3/2007 | Murphy ............... | B62D 43/045 224/42.21 |
| 7,487,952 B2 | * | 2/2009 | Murphy ............... | B62D 43/045 224/42.21 |
| 7,708,175 B2 | * | 5/2010 | Edwards ................. | B60R 11/06 224/42.14 |
| 7,770,764 B2 | | 8/2010 | Rock et al. | |
| 8,613,356 B1 | * | 12/2013 | Ihnatisin .............. | B62D 43/007 206/304 |
| 8,650,732 B2 | * | 2/2014 | Huber .................... | B60B 30/08 224/42.2 |

(Continued)

OTHER PUBLICATIONS

2005 Lexus RX Owner's Manual, Toyota, pp. 496-497, 2005.

*Primary Examiner* — Justin Larson

(57) ABSTRACT

A spare tire storage cover assembly a spare tire and a wheel cover. The spare tire has a tire and a metal wheel. The metal wheel defines a central attachment portion encircled by an outer rim with a wheel retaining member of a retraction device is inserted through an opening in the central attachment portion. The wheel cover has a disk portion with a first surface and a second surface, and a cylindrical portion extending from a central area of the first surface of the disk portion. The first surface has a plurality of alignment fins that extend in a radial outward direction from the cylindrical portion with distal edges thereof being dimensioned such that with the cylindrical portion inserted into the metal wheel, contact between the alignment fins and an inner circumferential surface of the outer rim centers the wheel cover relative to the metal wheel.

14 Claims, 7 Drawing Sheets

(56) References Cited

U.S. PATENT DOCUMENTS

| | | | |
|---|---|---|---|
| 8,919,621 B2* | 12/2014 | O'Brien | B62D 43/005 224/42.2 |
| 2006/0104768 A1 | 5/2006 | Park et al. | |
| 2006/0284152 A1 | 12/2006 | Murphy | |
| 2007/0241144 A1* | 10/2007 | Rock | B62D 35/02 224/42.23 |
| 2008/0001131 A1* | 1/2008 | Murphy | B62D 43/045 254/323 |
| 2008/0047985 A1* | 2/2008 | Newbill | B62D 43/002 224/42.2 |
| 2013/0153612 A1 | 6/2013 | O'Brien et al. | |

* cited by examiner

SPARE TIRE STORAGE COVER ASSEMBLY

BACKGROUND

Field of the Invention

The present invention generally relates to a spare tire storage cover assembly. More specifically, the present invention relates to spare tire storage cover assembly that includes an aerodynamic cover.

Background Information

Many vehicles include space under a rear area of the vehicle for storing a spare tire.

SUMMARY

One object of the present disclosure is to provide a spare tire stored beneath a vehicle body structure with an aerodynamic cover.

In view of the state of the known technology, one aspect of the present disclosure is to provide a spare tire storage cover assembly with a spare tire retraction device, a spare tire and a wheel cover. The spare tire retraction device has a wheel retaining member. The spare tire has a tire and a metal wheel, the metal wheel defining an outer rim and a central attachment portion encircled by the outer rim. The wheel retaining member is inserted through an opening in the central attachment portion. The wheel cover includes a disk portion having a first surface and a second surface, and a cylindrical portion. The cylindrical portion extends from a central area of the first surface of the disk portion. The first surface has a plurality of alignment fins that extend in a radial outward direction from the cylindrical portion. Distal edges of the cylindrical portion are dimensioned such that with the cylindrical portion inserted into the metal wheel, contact between the alignment fins and an inner circumferential surface of the outer rim centers the wheel cover relative to the metal wheel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
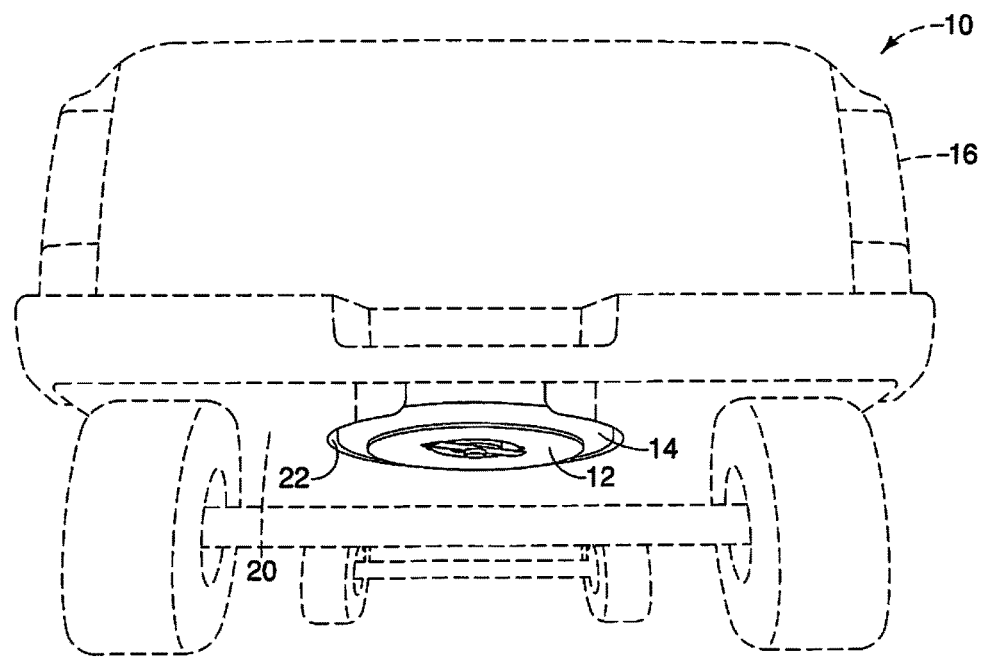
FIG. 1 is a rear view of a vehicle showing an area of an underside of the vehicle including a spare tire receiving recess that retains a spare tire and a spare tire storage cover assembly in accordance with a first embodiment.

Referring initially to FIG. 1, a vehicle 10 that includes a spare tire storage cover assembly 12 is illustrated in accordance with a first embodiment.

The vehicle 10 is depicted as a pickup truck, however, it should be understood from the drawings and the description herein that the vehicle 10 can be any vehicle design where a spare tire 14 (FIG. 2) is stored beneath the vehicle 10. Specifically, the vehicle 10 can be a coupe, a sedan, an SUV, a van or the depicted pickup truck.

Figure 2:
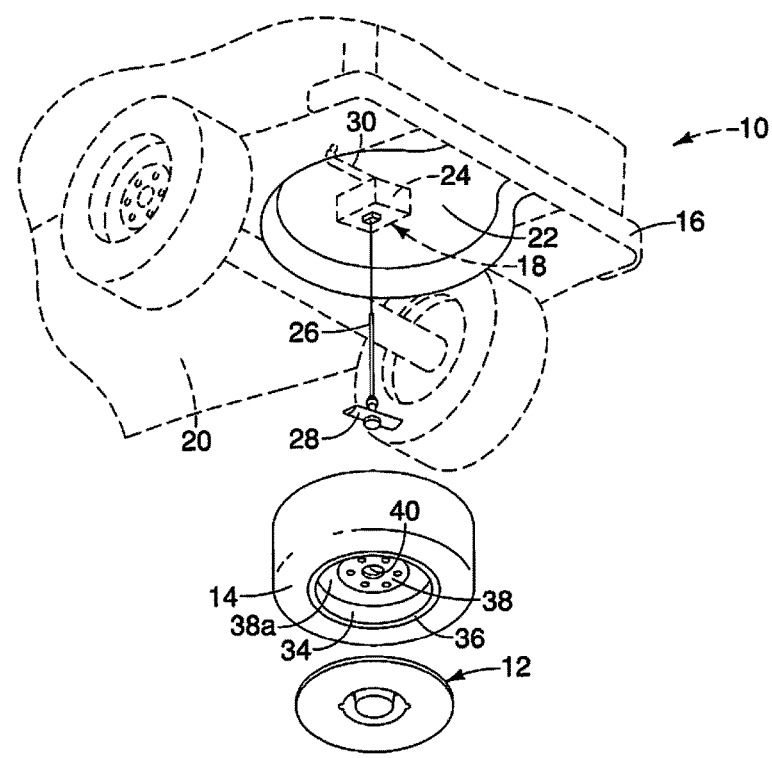
FIG. 2 is an exploded perspective view of the vehicle and the area of the underside of the vehicle showing the spare tire receiving recess, the spare tire, a spare tire retraction device and a wheel cover of the spare tire storage cover assembly in accordance with the first embodiment.

As shown in FIG. 2, the vehicle 10 includes a vehicle body structure 16 and a spare tire retraction device 18. The vehicle body structure 16 includes an underside 20 having a spare tire receiving recess 22.

As is also shown in FIG. 2, the spare tire retraction device 18 includes a winding mechanism 24, a cable 26 and a wheel retaining member 28. The winding mechanism 24 can be an electric motor-powered device, or can be a geared mechanism operated by a removable crank arm 30 that is used to manually wind the cable 26 around a spool (not shown) thereby drawing the spare tire 14 up into the spare tire receiving recess 22. The crank arm 30 is also used to unwind the cable 26 from the spool within the winding mechanism 24, thereby lowering the spare tire 14 when needed. The wheel retaining member 28 is fixedly attached to a lower end of the cable 26 in a conventional manner. The wheel retaining member 28 has an overall rectangular shape whose function is further described below with reference to the spare tire 14. Since spare tire retraction devices are conventional geared mechanisms, further description is omitted for the sake of brevity.

Figure 3:
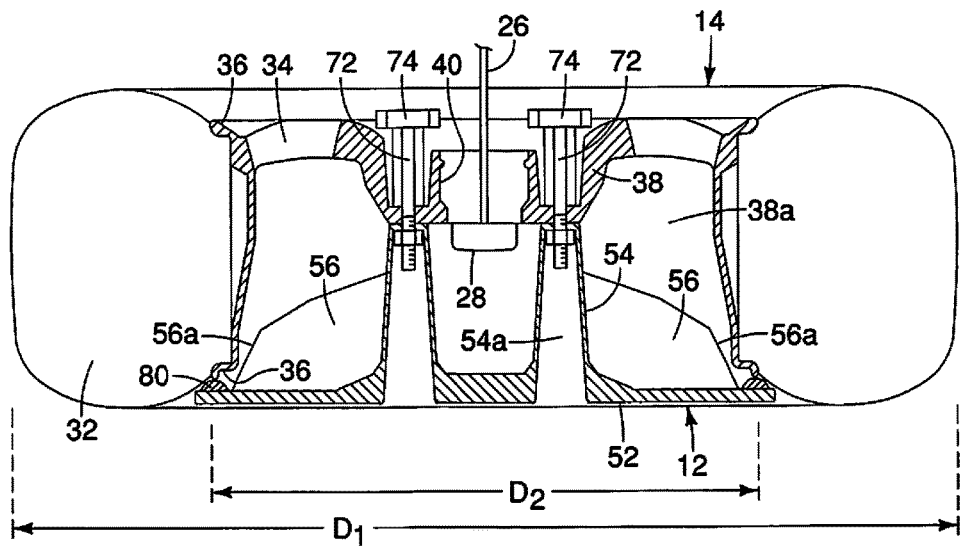
FIG. 3 is a cross-sectional view of the spare tire, elements of the spare tire retraction device and the spare tire storage cover assembly in accordance with the first embodiment.
Figure 4:
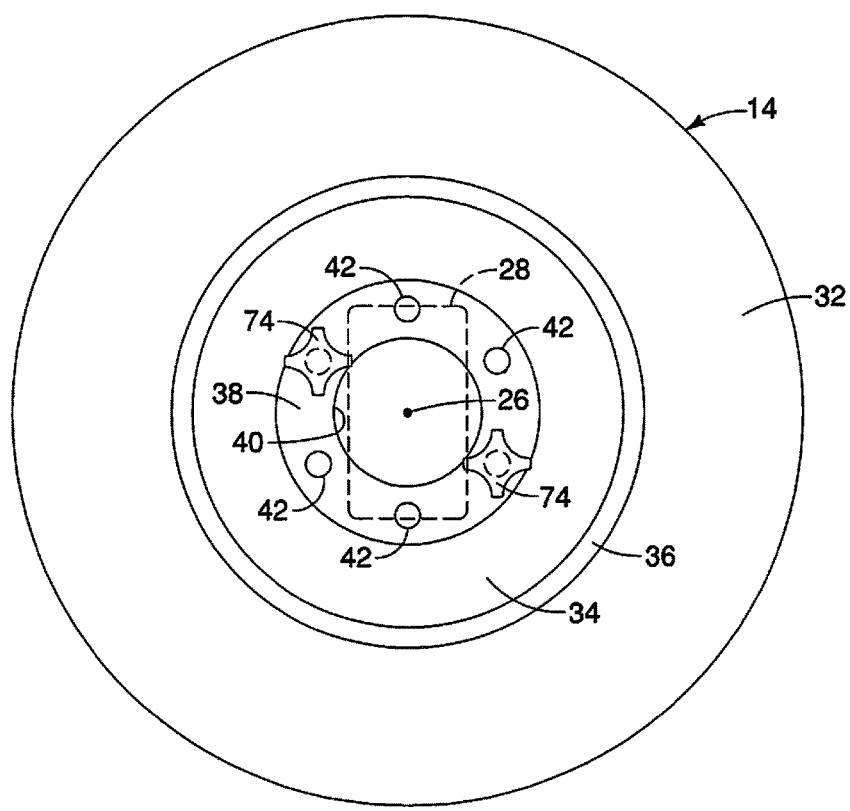
FIG. 4 is a top view of the spare tire showing fasteners of the spare tire storage cover assembly in accordance with the first embodiment.

As shown in FIGS. 2, 3 and 4, the spare tire 14 includes a tire 32 and a metal wheel 34. The tire 32 is a conventional tire made of, for example, synthetic rubber, natural rubber, fabric and wire, ply-belt material and/or additional chemical compounds. Since tires are conventional vehicle elements, further description is omitted for the sake of brevity. The metal wheel 34 is made of, for example, steel, iron alloys, magnesium alloys, aluminum alloys, etc. The metal wheel 34 includes outer rims 36 and a central attachment portion 38. The central attachment portion 38 defines a concaved space 38a surrounded or encircled by the outer rims 36. The central attachment portion 38 includes a central opening 40 and a plurality of lug openings 42 (also referred to as wheel stud apertures). Since metal wheels are conventional vehicle elements, further description is omitted for the sake of brevity.

As shown in FIG. 3, the spare tire 14 (and the tire 32) has an overall outer diameter $D_1$. The tire 32 is typically installed to the metal wheel 34 such that radial inner beads thereof are forced into contact with the outer rims 36 of the metal wheel 34 in a conventional manner such that the tire 32 and the outer rims 36 of the metal wheel 34 create a sealed pneumatic chamber that can be filled with air and pressurized. As also shown in FIG. 3, the outer rims 36 of the metal wheel 34 have an overall outer diameter of $D_2$ that is less than the overall outer diameter $D_1$ of the spare tire 14.

As shown in FIG. 3, the wheel retaining member 28 is inserted through the opening 40 of the central attachment portion 28 such that the cable 26 extends there though. In this condition, the spare tire retraction device 18 can be operated to draw the spare tire 14 up under the vehicle 10 for storage in the spare tire receiving recess 22 shown in FIGS. 1 and 2.

A description of the spare tire storage cover assembly 12 is now provided with specific reference to FIGS. 3 through 10. The spare tire storage cover assembly 12 primarily includes a wheel cover 50 that has a disk portion 52, a cylindrical portion 54 and a plurality of alignment fins 56. The disk portion 52 of the wheel cover has a first surface 52a (an upper surface) and a second surface 52b (a lower surface). Features of the disk portion 52 are described further below.

The cylindrical portion 54 is formed integrally with the disk portion 52 and extends from a central area of the first surface 52a of the disk portion 52. The plurality of alignment fins 56 extend from the first surface 52a and in a radial outward direction from the cylindrical portion 54. Distal edges 56a of the alignment fins 56 are dimensioned such that with the cylindrical portion 54 inserted into the concave space 38a of the metal wheel 34, contact between the alignment fins 56 and an inner circumferential surface of the outer rim 36 centers the wheel cover 50 relative to the metal wheel 34.

The cylindrical portion 54 of the wheel cover 50 basically includes inner conical wall 58 (an inner cylinder or cone), an outer conical wall 60 (an outer cylinder or cone) and an annular wall 62 (a base). In the first embodiment, the inner conical wall 58 is depicted with a conical shape, but can alternatively be cylindrically shaped. Further, since the diameter change of the inner conical wall 58 from one end to the other is so slight, the inner conical wall 58 has an overall appearance of a cylinder. Hence, the inner conical wall 58 is also referred to as a cylindrical wall. Similarly, the outer conical wall 60 is depicted with a conical shape, but can alternatively be cylindrically shaped. Further, since the diameter change of the outer conical wall 60 from one end to the other is so slight, the outer conical wall 60 has an overall appearance of a cylinder. Hence, although the cylindrical portion 54 is at least partially defined by concentric conical portions (the inner and outer conical walls 58 and 60), the cylindrical portion 54 has an overall appearance of a cylinder.

Figure 5:
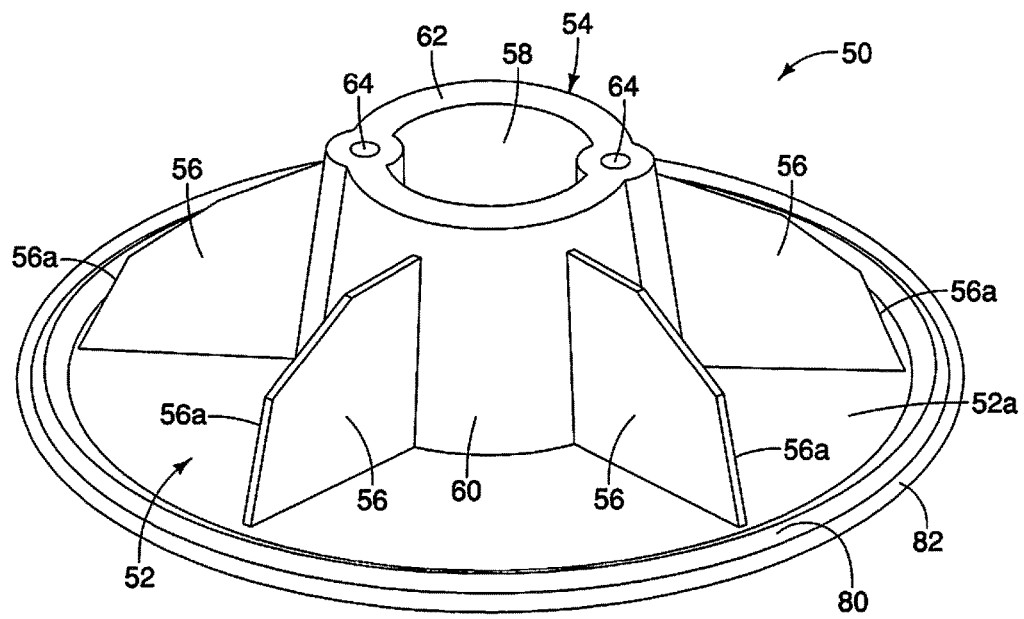
FIG. 5 is a perspective view of the wheel cover of the spare tire storage cover assembly shown removed from the spare tire in accordance with the first embodiment.
Figure 6:
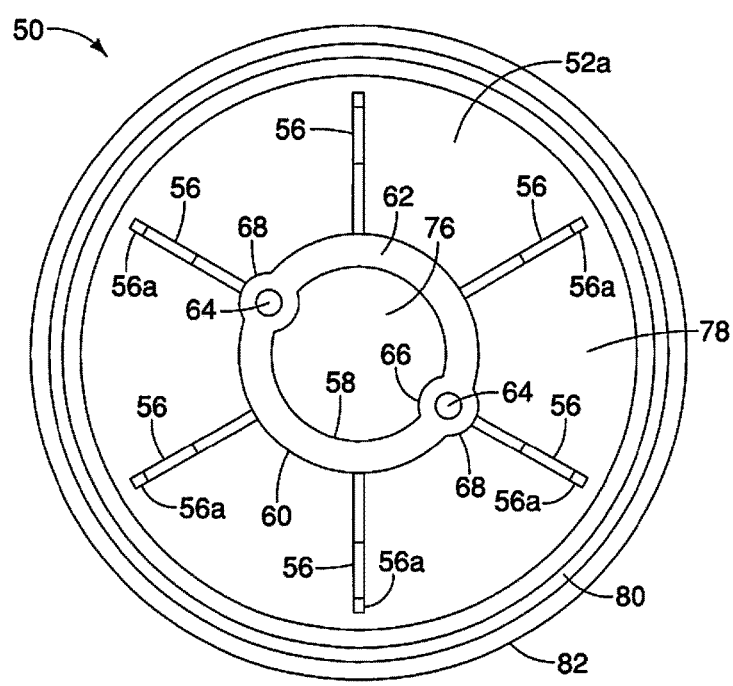
FIG. 6 is a top view of the wheel cover of the spare tire storage cover assembly shown removed from the spare tire in accordance with the first embodiment.

The annular wall 62 is an upper base section of the cylindrical portion 54. Specifically, the annular wall 62 extends between upper edges of the inner conical wall 58 and the outer conical wall 60. The annular wall 62 has a lower surface and an upper surface, and further includes two attachment openings 64 that are spaced apart from one another that extend from the lower surface to the upper surface of the annular wall 62. The two attachment openings 64 are positioned along the annular wall 62 at 180° intervals (the two attachment openings 64 are 180° apart from one another relative to the circular or annular shape of the annular wall 62). As shown in FIGS. 5 and 6, the cylindrical portion 54 includes inward protrusions 66 and outward protrusions 68. More specifically, the inner conical wall 58 is formed with the inward protrusions 66, which are adjacent to respective ones of the attachment openings 64. Similarly, the outer conical wall 60 is formed with the outward protrusions 68, adjacent to respective ones of the attachment openings 64. The cylindrical portion 54 is formed with two imbedded nuts 70 that are aligned with respective ones of the attachment openings 64. The imbedded nuts 70 have threaded apertures that are configured to receive corresponding fasteners 72. The fasteners 72 include handles 74, as described in greater detail below.

Figure 7:
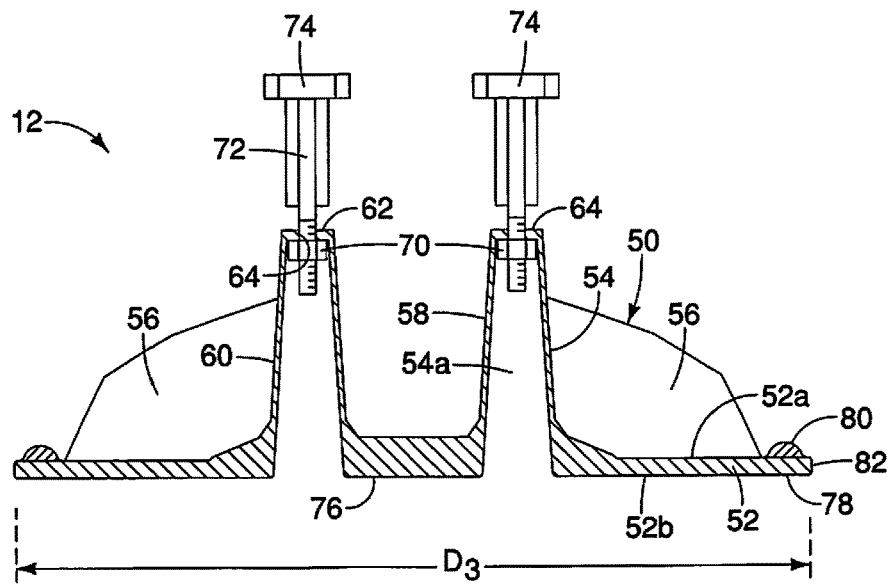
FIG. 7 is a cross-sectional view of the wheel cover of the spare tire storage cover assembly in accordance with the first embodiment.
Figure 8:
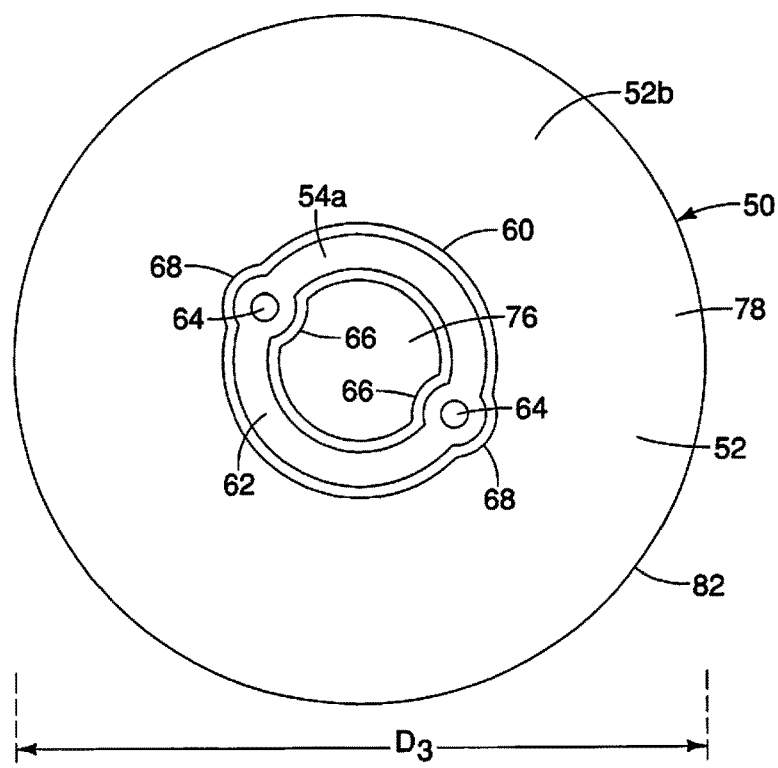
FIG. 8 is a bottom view of the wheel cover of the spare tire storage cover assembly in accordance with the first embodiment.

As shown in FIGS. 7 and 8, the disk portion 52 of the wheel cover 50 includes a radially inward portion 76 and a radially outward portion 78. The radially inward portion 76 is located at a lower end of the cylindrical portion 54 and is separated from the radially outward portion 78 by an annular gap defined between lower ends of the inner conical wall 58 and the outer conical wall 60. The annular gap is open to space (a cylindrically shaped channel) between the inner conical wall 58 and the outer conical wall 60, with the annular wall 62 defining an upper wall of the annular gap. The imbedded nuts 70 are over molded within the material that forms the cylindrical portion 54. More specifically, the imbedded nuts 70 are retained within the space between the inner conical wall 58 and the outer conical wall 60 adjacent to the annular wall 62. The annular wall 62 extends in directions that are parallel to the radially inward portion 76 of the disk portion 52. The annular wall 62 is also parallel to areas of the radially outward portion 78 proximate the cylindrical portion 54.

As shown in FIGS. 7 and 8, the radially outward portion 78 defines an outer edge section 82. The outer edge section 82 has an outer diameter $D_3$. As shown in FIG. 3, the outer diameter $D_3$ is slightly greater that the outer diameter $D_2$ of the outer rims 36 of the metal wheel 34 of the spare tire 14. However, in an alternate embodiment, the outer diameter $D_3$ can be equal to the outer diameter $D_2$ of the outer rims 36 of the metal wheel 34 of the spare tire 14. As shown in FIGS. 3 and 5-7, the radially outward portion 78 includes an annular seal 80 that contacts the spare tire 14 restricting the ingress of debris and water between the spare tire 14 and the wheel cover 50.

As shown in FIG. 3, the wheel cover 50 is attached to the spare tire 14 via the fasteners 72 (also referred to as attachment fasteners). The fasteners 72 are installed through the lug openings 42 (wheel stud apertures) and threaded into the imbedded nuts 70. The fasteners 72 are rotated by grasping the handles 74, which are non-movably fixed to the threaded shafts of corresponding ones of the fasteners 72.

After the wheel cover 50 is fixed to the spare tire 14, the wheel retaining member 28 is inserted through the opening 40 in the central attachment portion 38 of the metal wheel 34 of the spare tire 14. The wheel retaining member 28 has a width that is smaller than the diameter of the opening 40 and can easily be inserted therethrough. Once through the opening 40, the wheel retaining member 28 can be positioned between the inward protrusions 66, as indicated in FIGS. 3 and 4. The inward protrusions 66 (radially inwardly extending protrusions) of the cylindrical portion 54 are dimensioned such that with the wheel cover 50 attached to the spare tire 14, the inward protrusions 66 limit rotational movement of the wheel retaining member 28 of the spare tire retraction device 18 relative to the wheel cover 50 and the spare tire 14.

The inclusion of the wheel cover 50 on the lower surface of the spare tire 14 under the vehicle 10, provides a smooth surface that give an aerodynamic effect to the lower surface of the vehicle 10, when the vehicle 10 is being driven. In the absence of the wheel cover 50, air swirls within the concave space 38a of the spare tire 14 when the vehicle 10 is being driven. Hence, the spare tire storage cover assembly 12 (which includes the wheel cover 50) provides a benefit to the vehicle 10 in situations where aerodynamics of the vehicle 10 are of concern.

Second Embodiment

Figures 9, 10:
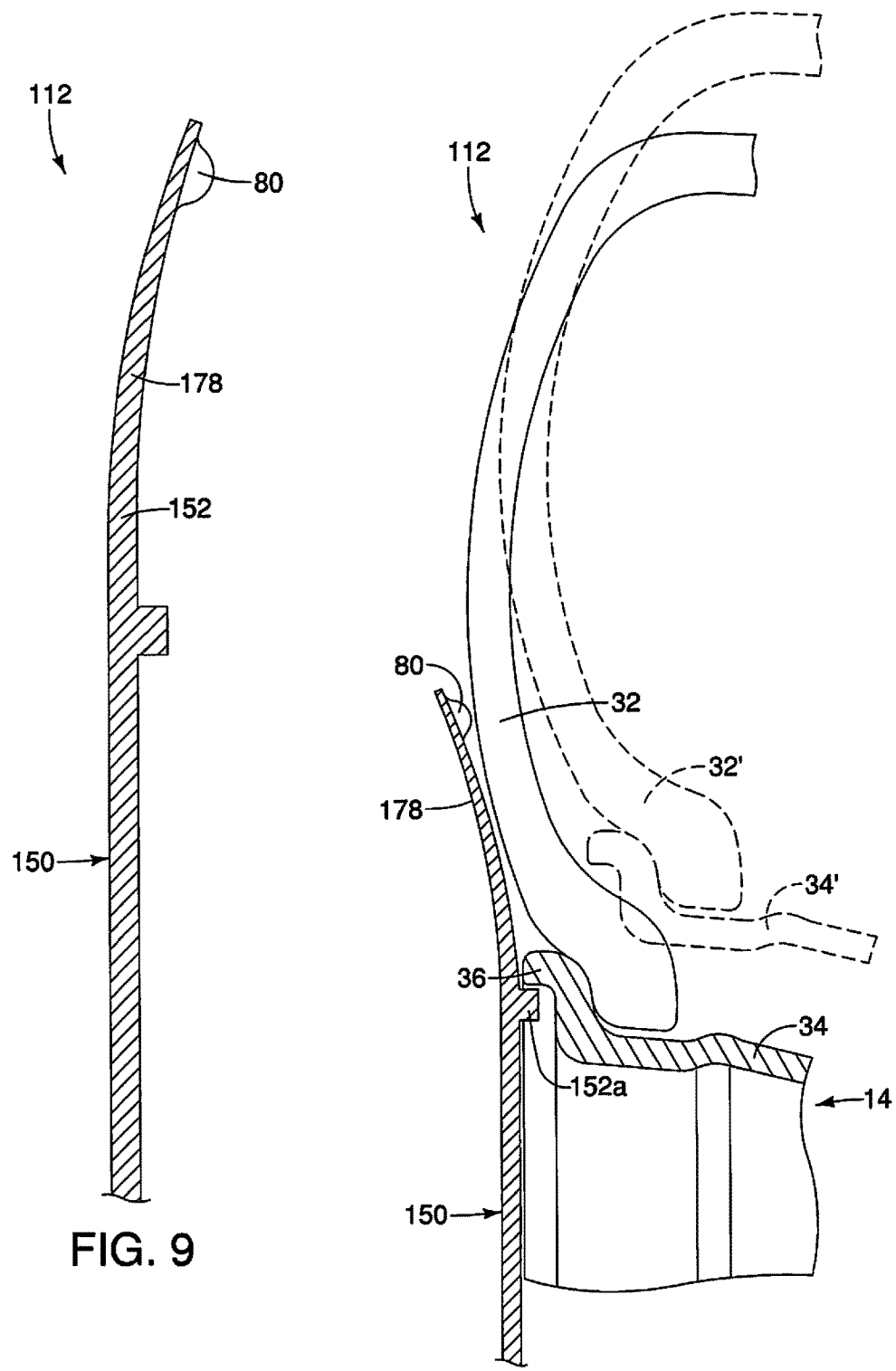
FIG. 9 is a cross-sectional view of a portion of a wheel cover of a spare tire storage cover assembly in accordance with a second embodiment.
FIG. 10 is a cross-sectional view of the portion of the wheel cover depicted in FIG. 9, showing the wheel cover installed to the spare tire in accordance with the second embodiment.

Referring now to FIGS. 9 and 10, a spare tire storage cover assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The storage cover assembly 112 includes a wheel cover 150 that attaches to the spare tire 14 in a manner identical to that of the wheel cover 50 of the first embodiment. Although not shown, the wheel cover 150 includes the cylindrical portion 54 as described in the first embodiment. However, in the second embodiment, the wheel cover 150 includes a disk portion 152 with a radially outward portion 178 that has an outer diameter that is greater than the diameter $D_3$ of the first embodiment. Consequently, the radially outward portion 178 extends to a mid-section of the side wall of the tire 32 of the spare tire 14. The radially outward portion 178 further includes an annular projection 152a that is positioned to contact an inner radial surface of the outer rim 36 of the metal wheel 34 of the spare tire 14.

The distal end of the radially outward portion 178 further includes the annular seal 80. As shown in FIG. 10, the annular seal 80 contacts the mid-section of the side wall of the tire 32 of the spare tire 14, thereby limiting the ingress of debris and water between the wheel cover 150 and the spare tire 14. Further, as shown in FIG. 9 in an uninstalled state, the radially outward portion 178 in non-planar. Specifically, the radially outward portion 178 is flexible and resilient such that in an uninstalled state the radially outward portion 178 defines a concaved area along the first surface thereof, as shown in FIG. 9. In an installed state shown in FIG. 10, with the wheel cover 150 attached to the spare tire 14, the radially outward portion 178 flexes such that the radially outward portion 178 of the wheel cover 150 conforms to the shape and geometry of adjacent surfaces of the spare tire.

Further, as shown in FIG. 10, the flexible configuration of the radially outward portion 178 makes it possible for the wheel cover 150 to be installed to any of a variety of sized spare tires, such as a spare tire with a tire 32' and a metal wheel 34', where the tire 32' and the metal wheel 34' have overall shapes and diameter that differ from the spare tire 14 with the tire 32 and the metal wheel 34. Since the radially outward portion 178 can flex, even when used with a spare tire that differs from the spare tire 14, the radially outward portion 178 contacts the tire 32' providing the desired aerodynamic effects.

Third Embodiment

Figure 11:
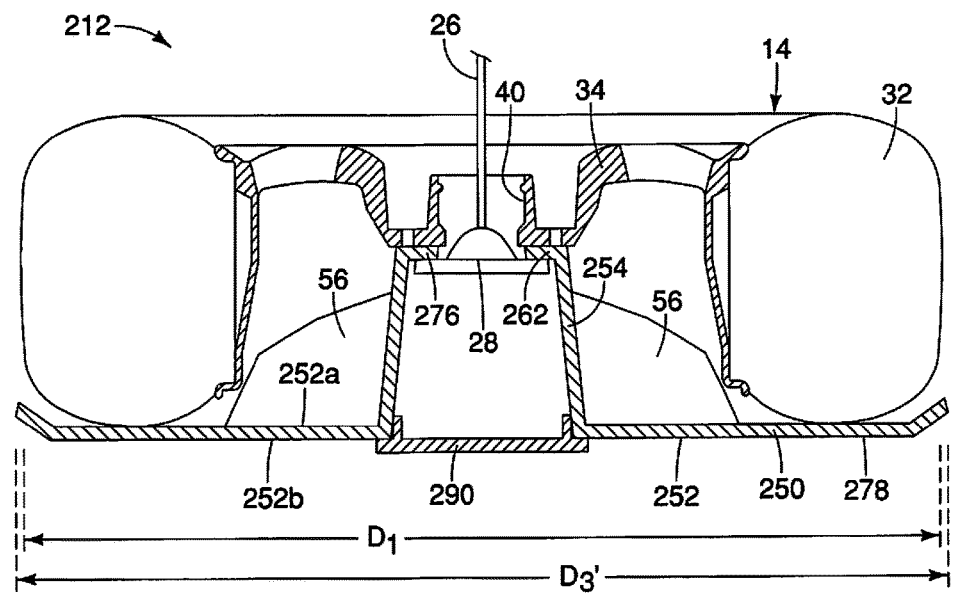
FIG. 11 is a cross-sectional view of the spare tire with a wheel cover of a spare tire storage cover assembly in accordance with a third embodiment.
Figure 12:
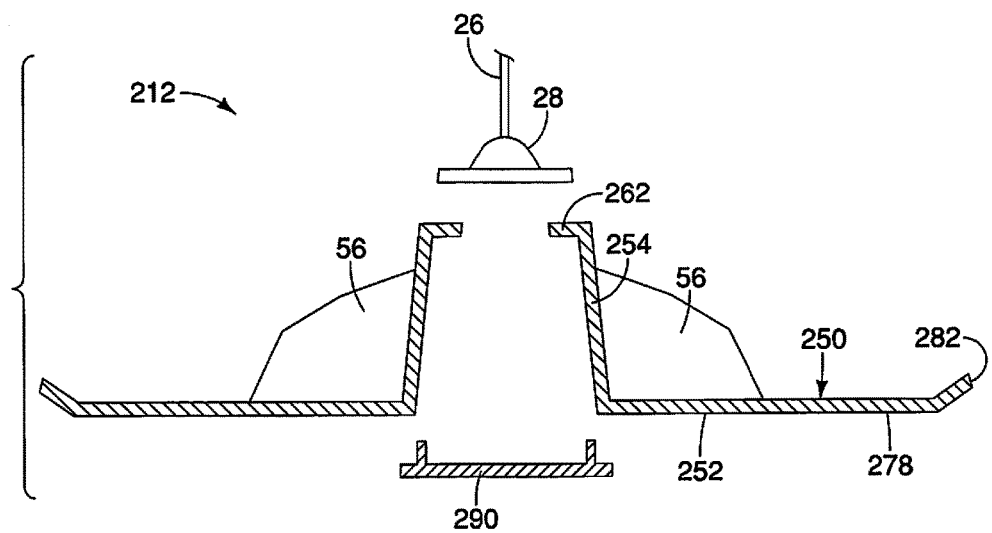
FIG. 12 is another cross-sectional view of the wheel cover depicted in FIG. 11, showing the wheel cover removed from the spare tire in accordance with the third embodiment.

Referring now to FIGS. 11 and 12, the spare tire 14 and a spare tire storage cover assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the second embodiment that differ from the parts of the first embodiment will be indicated with a single prime (').

As shown in FIGS. 11 and 12, the spare tire storage cover assembly 212 includes a wheel cover 250 that has a disk portion 252 and a cylindrical portion 254. The wheel cover 250 has a radially inward portion 76 and a radially outward portion 278 that are not co-planar, but are spaced apart from one another. The cylindrical portion 254 is a single cylinder or cone portion that extends from an inner edge of the radially outward portion 278 to the radially inward portion 276.

The radially outward portion 278 has an overall outer diameter $D_3$, measured at an outer edge section 282 thereof, that is greater than the diameter $D_1$ of the spare tire 14. Consequently, the wheel cover 250 completely covers lower surfaces of the spare tire 14. The radially inward portion 276 basically defines an annular wall 262 of the cylindrical portion 254. The annular wall 262 includes a central aperture that aligns with the opening 40 of the spare tire 14. The wheel retaining member 28 is inserted through the central aperture in the annular wall 262 and through the opening 40 when the wheel cover 250 and the spare tire 14 are stowed under the vehicle 10 by the spare tire retraction device 18. Once the wheel cover 250 and the spare tire 14 are stowed, a separate cover 290 is snap fitted to a lower end of the cylindrical portion 254 of the wheel cover 250. The cover 290 and the wheel cover 250 conceal the spare tire 14 and provide an aerodynamic effect under the vehicle 10.

In the third embodiment, the wheel cover 250 includes the alignment fins 56, as described above with respect to the first embodiment.

Fourth Embodiment

Figure 13:
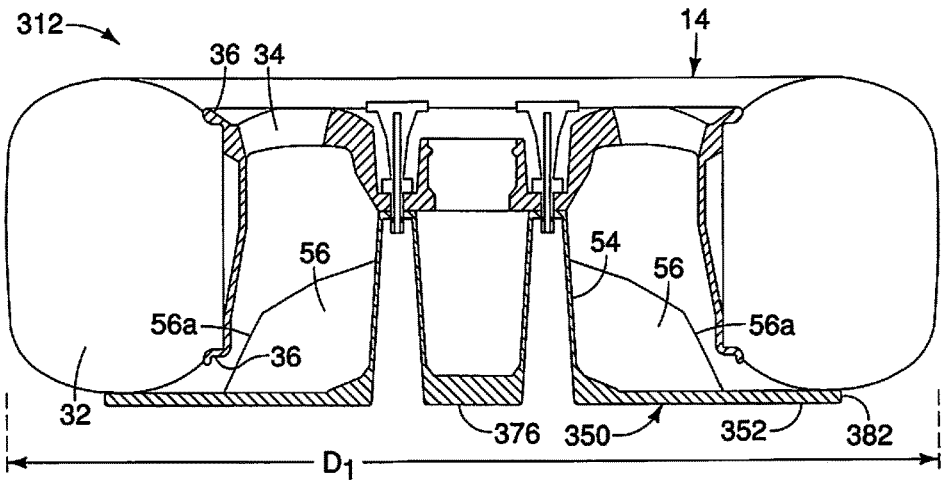
FIG. 13 is a cross-sectional view of the spare tire with a wheel cover of a spare tire storage cover assembly in accordance with a fourth embodiment.

Referring now to FIG. 13, a spare tire storage cover assembly 312 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 13, the spare tire storage cover assembly 312 includes a wheel cover 350 that includes a disk portion 352 and a cylindrical portion 54. The disk portion 352 has a radially outward portion with an outer edge section 382 that defines an outer diameter that is larger than the diameter of the outer rim 36 of the spare tire 14, but is less that the overall diameter $D_1$ of the spare tire 14. Hence, the disk portion 352 covers all of the metal wheel 34 of the spare tire 14, and approximately half of the tire 32.

The cylinder portion 54 is as described above with respect to the first embodiment.

Fifth Embodiment

Figure 14:
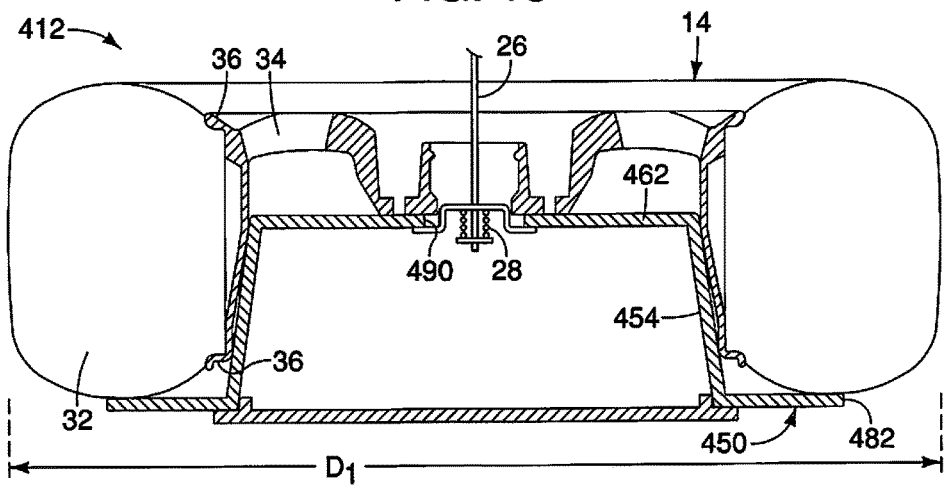
FIG. 14 is a cross-sectional view of the spare tire with a wheel cover of a spare tire storage cover assembly in accordance with a fifth embodiment.

Referring now to FIG. 14, a spare tire storage cover assembly 412 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 14, the spare tire storage cover assembly 412 includes a wheel cover 450 that has a disk portion with an outer edge section 482 having an outer diameter that is larger than the diameter of the outer rim 36 of the spare tire 14, but is less that the overall diameter $D_1$ of the spare tire 14. The wheel cover 450 also includes a cylindrical portion 454. The cylindrical portion 454 has a conical shape with a tapering outer diameter that conforms with the outer rim 36 of the spare tire 14. Hence, the outer surface of the cylindric portion 454 serves as an alignment surface, centering the wheel cover 450 within the spare tire 14. As with the third embodiment described above, the wheel retaining member 28 is inserted through the opening 40 of the metal wheel 34, and also inserted through an opening 490 of an annular wall 462 of the wheel cover 450, such that the spare tire retraction device 18 retains both the wheel cover 450 and the spare tire 14.

Sixth Embodiment

Figure 15:
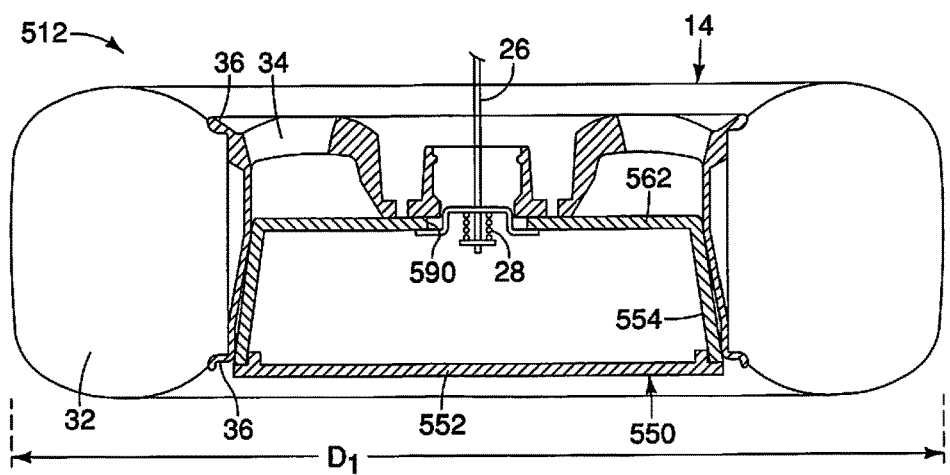
FIG. 15 is a cross-sectional view of the spare tire with a wheel cover of a spare tire storage cover assembly in accordance with a sixth embodiment.

Referring now to FIG. 15 a spare tire storage cover assembly 512 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The spare tire storage cover assembly 512 includes a wheel cover 550 that has a disk portion 552 and a cylindrical portion 554. The wheel cover 550 is separate from the cylindric portion 554 and is snap-fitted thereto. The outer diameter of the disk portion 552 is the same or slightly less than the overall outer diameter of the outer rims 36 of the spare tires 14.

The cylindrical portion 554 is similar to the cylindrical portion 454 of the fifth embodiment in that the cylindrical portion 554 has a conical shape with a tapering outer diameter that conforms with the outer rim 36 of the spare tire 14. Hence, the outer surface of the cylindric portion 554 serves as an alignment surface, centering the wheel cover 550 within the spare tire 14. However, in the sixth embodiment, the wheel cover 540 only covers the metal wheel 34 of the spare tire 14.

The vehicle structure and vehicle elements other that the spare tire storage cover assemblies include conventional components that are well known in the art. Since such vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the spare tire storage cover assembly. Accordingly, these terms, as utilized to describe the present invention should be interpreted relative to a vehicle equipped with the spare tire storage cover assembly.

The term "configured" as used herein to describe a component, section or part of a device includes structure that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A spare tire storage cover assembly, comprising:
a spare tire retraction device having a wheel retaining member;
a spare tire having a tire and a metal wheel, metal wheel defining an outer rim and a central attachment portion encircled by the outer rim with the wheel retaining member inserted through an opening in the central attachment portion; and
a wheel cover having a disk portion having a first surface and a second surface, and a cylindrical portion extending from a central area of the first surface of the disk portion, the first surface having a plurality of alignment fins that extend in a radial outward direction from the cylindrical portion with distal edges thereof being dimensioned such that with the cylindrical portion inserted into the metal wheel, contact between the alignment fins and an inner circumferential surface of the outer rim centers the wheel cover relative to the metal wheel, the cylindrical portion including a pair of radially inwardly extending protrusions that are dimensioned such that with the wheel cover attached to the spare tire and the spare tire retained by the spare tire retraction device, the pair of radially inwardly extending protrusions limit rotational movement of the wheel retaining member of the spare tire retraction device relative to the wheel cover and the spare tire.

2. The spare tire storage cover assembly according to claim 1, wherein
the central attachment portion of the metal wheel includes a plurality of wheel stud apertures, and
the cylindrical portion of the wheel cover includes at least one aperture that aligns with a corresponding one of wheel stud apertures, with an attachment fastener releasably fastening the wheel cover to the metal wheel.

3. The spare tire storage cover assembly according to claim 1, wherein
the disk portion of the wheel cover includes an annular seal attached to and extending from the first surface, the annular seal being positioned between the plurality of alignment fins and a radially outward edge of the disk portion.

4. The spare tire storage cover assembly according to claim 1, wherein
the cylindrical portion includes an inner cone and an outer cone that is concentric with the inner cone, and an annular wall being defined between the inner cone, the outer cone being spaced apart from the disk portion of the wheel cover, the inner cone being formed with the pair of radially inwardly extending protrusions.

5. The spare tire storage cover assembly according to claim 4, wherein
the at least one aperture is defined in the annular wall of the cylindrical portion adjacent to one of the pair of radially inwardly extending protrusions.

6. The spare tire storage cover assembly according to claim 1, wherein
the disk portion of the wheel cover includes a conically shaped edge section that defines an outer diameter equal to or greater than an outer diameter of the tire of the spare tire.

7. The spare tire storage cover assembly according to claim 1, wherein
the disk portion of the wheel cover defines an outer diameter equal to or greater than an outer diameter of outer rim of the metal wheel of the spare tire and less than an outer diameter of the tire of the spare tire.

8. The spare tire storage cover assembly according to claim 1, wherein
the wheel retaining member extends through the opening of the central attachment portion of the metal wheel and extends through a corresponding opening in the cylindrical portion of the wheel cover simultaneously retaining the spare tire and the wheel cover.

9. A spare tire storage cover assembly, comprising:
a spare tire retraction device having a wheel retaining member;
a spare tire having a tire and a metal wheel, metal wheel defining an outer rim and a central attachment portion encircled by the outer rim with the wheel retaining member inserted through an opening in the central attachment portion; and
a wheel cover having a disk portion having a first surface and a second surface, and a cylindrical portion extending from a central area of the first surface of the disk portion, the first surface having a plurality of alignment fins that extend in a radial outward direction from the cylindrical portion with distal edges thereof being dimensioned such that with the cylindrical portion inserted into the metal wheel, contact between the alignment fins and an inner circumferential surface of the outer rim centers the wheel cover relative to the metal wheel, the disk portion of the wheel cover includes a radially inward portion and a radially outward portion, the radially inward portion being generally planar and the radially outward portion being non-planar, the radially outward portion of the disk portion being flexible and resilient such that in an uninstalled state the radially outward portion defines a concaved area along the first surface thereof, and in an installed state attached to the spare tire, the radially outward portion flexes such that the second surface of the wheel cover conforms to the shape and geometry of adjacent surfaces of the spare tire.

10. The spare tire storage cover assembly according to claim 9, wherein
the radially outward portion of the disk portion of the wheel cover includes an annular seal attached to and extending from the first surface, the annular seal being positioned between the plurality of alignment fins and a radially outward edge of the disk portion.

11. The spare tire storage cover assembly according to claim 9, wherein
the radially outward portion includes a conically shaped edge section that defines an outer diameter that is equal to or greater than an outer diameter of the tire of the spare tire.

12. A spare tire storage cover assembly, comprising:
a spare tire retraction device having a wheel retaining member;
a spare tire having a tire and a metal wheel, metal wheel defining an outer rim and a central attachment portion encircled by the outer rim with the wheel retaining member inserted through an opening in the central attachment portion; and
a wheel cover having a disk portion having a first surface and a second surface, and a cylindrical portion extending from a central area of the first surface of the disk portion, the first surface having a plurality of alignment fins that extend in a radial outward direction from the cylindrical portion with distal edges thereof being dimensioned such that with the cylindrical portion inserted into the metal wheel, contact between the alignment fins and an inner circumferential surface of the outer rim centers the wheel cover relative to the metal wheel, the cylindrical portion includes an inner cone and an outer cone that is concentric with the inner cone, and an annular wall being defined between the inner cone and the outer cone spaced apart from the disk portion of the wheel cover, the inner cone and the outer cone defining a cylindrically shaped channel therebetween, with the annular wall having pair of apertures formed therein.

13. The spare tire storage cover assembly according to claim 12, wherein
   the central attachment portion of the metal wheel includes a plurality of wheel stud apertures, and
   the pair of apertures of the annular wall align with corresponding ones of wheel stud apertures, with attachment fastener releasably fastening the wheel cover to the metal wheel.

14. The spare tire storage cover assembly according to claim 12, wherein
   the cylindrical portion of the wheel cover includes a pair of metal nuts that are over molded into the cylindrical portion between the inner cone and the outer cone adjacent to and aligned with the pair of apertures in the annular wall.

* * * * *